May 9, 1967 V. DEVE 3,318,639

FEEDING MEANS FOR GRANULAR OR POWDERED MATERIAL

Filed July 12, 1965

INVENTOR
Vagn DEVÉ

BY Pierre Lesperance

PATENT AGENT

United States Patent Office 3,318,639
Patented May 9, 1967

3,318,639
FEEDING MEANS FOR GRANULAR OR
POWDERED MATERIAL
Vagn Devé, 3025 Sherbrooke St. W.,
Montreal, Quebec, Canada
Filed July 12, 1965, Ser. No. 471,235
7 Claims. (Cl. 302—17)

The present invention relates to means for feeding granular or powdered material in dry state and discharging the material into a bin and maintaining the level of the material in said bin at a constant level while withdrawing material from said bin.

It is known to convey solid granular powdered material in dry state, such as sand, cement, flour, wheat, and the like, by means of compressed air to fill a material-receiving bin. In a plurality of such applications, it is particularly useful and desirable to maintain a predetermined level of the material in the bin, or at least to return the level to a predetermined datum line after withdrawal of some material from the bin.

Conventional methods of conveying granular material by means of compressed air in such a way as to maintain a fixed level of the material within the bin receiving said material, involve the use of timing devices for timing the flow of material fed to the bin, measuring devices for measurng a given volume of the material which is thereafter fed into the bin, photocell measurements, sonic devices, and the like.

These methods involve complicated and/or expensive devices and, despite their use, it is often very difficult to maintain an accurate fixed level of the material within the bin.

Accordingly, the general object of the present invention resides in the provision of means for maintaining a fixed level in a bin receiving granular or powdered material, said means being of very simple and inexpensive construction and being fail-proof in their operation and maintaining a very accurate level of the material within the bin.

Another object of the present invention resides in the provision of means of the character described, in which the fixed level of the material can be adjusted at will.

Another object of the present invention resides in the provision of means of the character described incorporating an improved valve design to stop the material flow, said valve design being very resistant to the abrasive action of dry sand and the like hard material.

Another object of the present invention resides in the provision of an assembly for feeding material in granular or powdered form by air under pressure to a bin or similar receptacle and bringing the material in said bin back to a predetermined adjustable level, after withdrawal of some of the material from the bin.

Another object of the present invention resides in the provision of means of the character described, more particularly designed to be used in conjunction with the conveying of molding sand into a shell molding machine for feeding the investment box and maintaining the level in said box constant.

The foregoing and other important objects of the present invention will become more obvious during the following disclosure and by referring to the drawings, in which.

Figure 1:
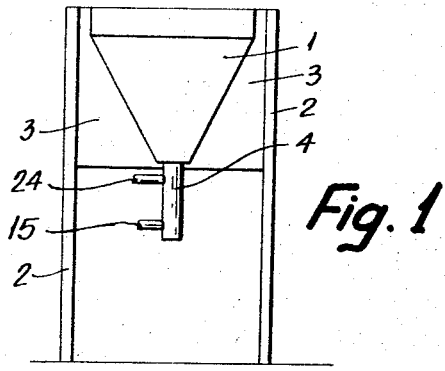
FIGURE 1 is a side elevation of a storage hopper and air lock or chamber in communication therewith and forming one part of the feeding and conveying system of the invention.
Figure 5:
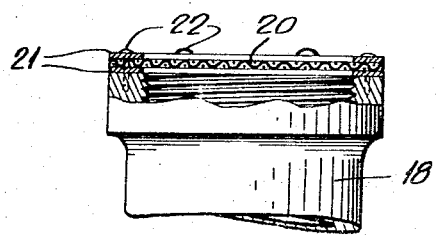
FIGURE 5 is a partial elevation, partly in longitudinal section, of the top portion of the discharge member shown in FIGURE 4.

Referring now more particularly to the drawings in which like reference characters indicate like elements throughout, reference numeral 1 indicates a standard hopper, of funnel shape, for receiving granular or powdered dry material, such as sand, cement, flour and the like.

Hopper 1 may be supported by flour-engaging legs 2 and web plates 3. The top end of the hopper is preferably closed by a screen such as an expanded plate forming a grating, as is conventional.

A cylindrical chamber 4 is inserted within a central hole made at the lower restricted end of hopper 1 and is welded to said hopper. This chamber 4 extends downwardly vertically and is closed at its top and bottom end by means of a cylindrical valve body 5 and a disc 6, respectively.

Body 5 is tightly fitted within the upper end of chamber 4 and is provided with a through bore 7, establishing communication between the hopper 1 and chamber 4.

A nipple 8 extends axially through bore 7, being hermetically closed at its upper end by a standard cap 9 screwed thereon and being connected at its lower end, by a standard pipe reducer 10, to a smaller diameter rigid pipe 11 extending vertically axially through cylindrical chamber 4 and passing through lower disc 6, pipe 11 being adapted to be connected to a supply of compressed air through a circuit, to be described hereinafter, for feeding compressed air into nipple 8.

Said nipple 8 is provided with a plurality of holes 12 in the cylindrical wall thereof and is surrounded by a rubber sleeve 13 extending substantially the whole length of nipple 8.

Sleeve 13 is made of rubber, or the like flexible and stretchable elastic material. Sleeve 13 is surrounded near both ends thereof by thin clamping bands 14 which maintain the marginal portions of the sleeve 13 in fluid-tight contact with nipple 8. Spacer blocks 14' serve to center the assembly of the nipple 8 and sleeve 13 within through bore 7, so as to leave a free space around sleeve 13 in the collapsed position of the latter. Blocks 14' are spaced from each other and are preferably secured to bands 14.

Figure 2:
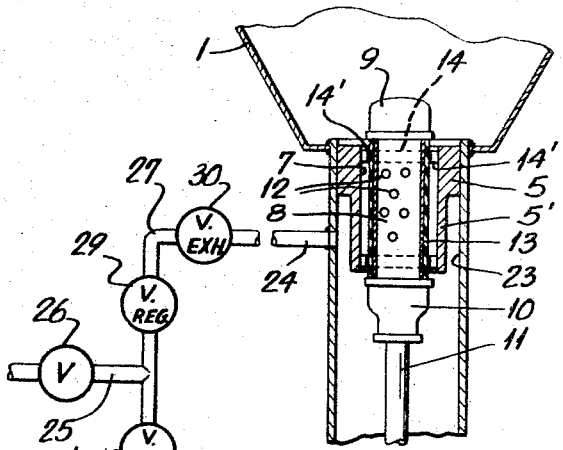
FIGURE 2 is a longitudinal section of part of the hopper and air lock chamber, shown in FIGURE 1, together with the pneumatic circuit therefor.
Figure 4:
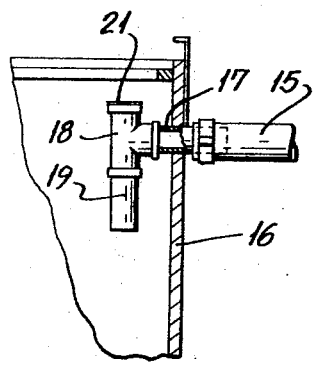
FIGURE 4 is a partial longitudinal section of a bin adapted to receive granular or powdered material from the discharge member of the feeding system shown in FIGURES 1 and 2, said discharge member maintaining in the bin a fixed level of material.

In the collapsed position of sleeve 13, as shown in FIGURE 2, when there is no compressed air fed to nipple 8, sand or other granular or powdered material in hopper 1, is free to flow into chamber 4 around sleeve 13 within through bore 7.

Figure 3:
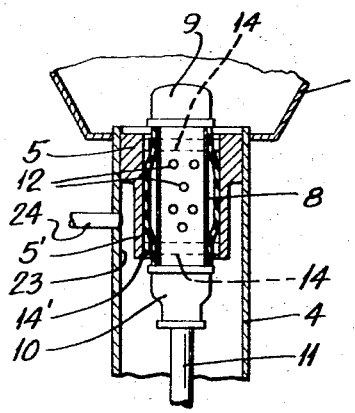
FIGURE 3 is a partial longitudinal section showing the same elements as shown in FIGURE 2, but wherein the valve is in closed position.

Upon admission of compressed air through rigid pipe 11, the air will flow into the nipple 8 and through the holes 12 thereof to expand elastic sleeve 13 which will then become applied against the surface of through bore 7 of valve body 5, as shown in FIGURE 3, to thereby close off the communication between hopper 1 and cylindrical chamber 4.

A very tight closure is achieved because the sleeve comes in contact with through bore 7 over a relatively large surface area, and it has been found that the sleeve will resist wear for a long time despite the fact that it may be used in connection with foundry sand which is very abrasive.

The lower end of cylindrical chamber 4 is connected by flexible hose 15 to the inside of a bin 16 for receiving the dry material and adapted to be filled to a predetermined level.

Bin 16 may be any receptacle adapted to be filled with dry material from hopper 1, such as an investment box for receiving foundry sand and investing the same into a mold for forming a foundry mold or core in shell molding.

Flexible hose 15 is more particularly secured to one end of a nipple 17 rigidly secured to and passing through the side wall of bin 16.

In accordance with the invention, a standard T-shaped pipe element 18 has its main branch screwed onto nipple 17 within bin 16, such that its transverse leg is vertically disposed, being connected at its lower open end with a nipple 19, screwed to the T18 and open at its two ends.

The upper end of the transverse leg of T18 is provided with a screen 20 secured thereon, to close the entire opening. For instance, screen 20 may be sandwiched between two flat rings 21 and the whole assembly fixed to the top of the T18 by means of screws, rivets, or the like, 22.

Screen 20 must be of a fine enough mesh size to prevent passage therethrough of the granular or powdered material, while allowing free escape of air.

Concerning cylindrical chamber 4, it will be noted that cylindrical body 5 has a lower skirt 5′, of restricted external diameter to define an annular space 23, opposite which opens a rigid pipe 24 secured to the lateral wall of chamber 4 and in communication therewith.

The preferred pneumatic circuit for feeding compressed air to the system includes a main air line 25 connected to a supply of compressed air and having a solenoid-operated shut-off valve 26. Air line 25 supplies air to two air line branches 27 and 28, branch 27 being connected to pipe 24 and being provided with air pressure regulating valve 29 and a quick exhaust valve 30.

Branch 28 is connected to pipe 11 for supplying air to the material shut-off hopper valve consisting of nipple 8, sleeve 13 and body 5. Branch 28 is provided with an air pressure regulating valve 29′ and with a check valve 31 allowing free passage of air from main air line 25 into pipe 11, but preventing return of the air from the hopper valve. Branch 28 is further provided with a side branch 32, by-passing check valve 31 and in turn provided with a flow regulating valve 33. Valves 29 and 29′ are of the venting type.

The system in accordance with the invention operates as follows: the main valve 26 being closed and cylindrical chamber 4 being at atmospheric pressure, together with nipple 8 and the inside of sleeve 13, the hopper valve is open and material in previously filled hopper 1 flows by gravity into chamber 4 until it attains the level of the lower end of skirt of body 5.

The sand comes to rest, there being no discharge through hose 15. Upon opening of main air valve 26, air flows through branch 28, valve 29′, check valve 31, and flow-regulating valve 33 and immediately causes expansion of sleeve 13 which closes the communication between the hopper 1 and chamber 4.

Air also flows through branch 27 into the now closed chamber 4 and fluidizes the sand in the chamber 4 and conveys the sand through hose 15 into bin 16, which is open to the atmospheric air at the top.

The mixture of air and sand flows through nipple 17 into the T18 and down through nipple 19 into the bin 16. Part of the air may escape through screen 20.

When the level of the sand, or other powdered material, within bin 16 reaches the lower open end of nipple 19 to finally close said lower open end, the flow of sand into the bin 15 automatically stops as the conveyed material compacts in nipple 19 as air continues to escape through screen 20.

Sand cannot escape through screen 20, because the mesh size of the same has been calculated to prevent such escape.

The main valve 26 is thereafter closed and the air in chamber 4 is quickly exhausted through quick exhaust valve 30, while the air within the hopper valve, that is within sleeve 13, escapes much more slowly, because the check valve 31 forces the air to flow back through the flow-regulating valve 33, which is adjusted in such a manner that the hopper valve will open; that is sleeve 13 will collapse only after the chamber 4 has attained atmospheric pressure, so as to prevent blow-off through hopper 1. The air escaping from sleeve 13 is discharged to the atmosphere through regulating valve, which is of the venting type, and the air from chamber 4 through valve 29 and quick exhaust valve 30. The valves 29 and 29′ are adjusted so as to provide the desired air pressure within sleeve 13 and chamber 4, which are different pressures for proper operation of the device.

In practice, the chamber 4 need only be of sufficient volume to provide a fresh charge of sand sufficient for replenishing bin 16 after partial withdrawal of powdered material from said bin.

When bin 16 is an investment box for use in connection with a core blower in shell molding, bin 16 swings around in side down position while in communication with the core box for investing the same with sand in a cycle of the core blower.

Naturally, a single feeding unit consisting of hopper 1 and chamber 4 and associated devices, may be used to feed sand to a plurality of investment boxes or bins 16, each provided with its own level-adjusting device 18.

Nipple 19 protruding downwardly from T18 can be of different lengths, or be screwed more or less in the T, to adjust the desired full level of bin 16. It will be noted that in core blowers it is important to have the investment box 15 filled at a constant level prior to each investment cycle in order to obtain molds or cores of uniform quality.

While a preferred embodiment in accordance with the invention has been illustrated and described, it is understood that various modifications may be resorted to without departing from the scope of the appended claims.

What I claim is:

1. A system for filling a container with granular or powdered material to a predetermined level, comprising, in combination with a container, a pipe having an outlet end portion disposed within said container, means connected to the inlet of said pipe for feeding therethrough a granular or powdered material in fluidized state under action of a gas under pressure admixed with said material, said outlet end portion of said pipe having a free opening for the discharge of said fluidized material into said container, said outlet end portion having an additional screened opening, disposed at a higher level than said free opening, for filtering said material from said gas to allow escape of said gas through said screened opening while preventing passage of said material through said screened opening, whereby, upon said material in said container attaining the level of said free opening of said outlet end portion, said material will plug said free opening and cause cessation of the flow of said material while allowing continuation of the flow of said gas with its escape through said screened opening said outlet end portion of said pipe consisting of a T-shaped portion having a horizontally disposed main leg and vertically disposed and axially aligned side legs open at their free end, the lower one of said side legs defining said free opening and the upper one of said side legs defining said screened opening.

2. A system as claimed in claim 1, wherein the lower one of said side legs is adjustable in length.

3. A system as claimed in claim 1, wherein said means to feed said inlet end of said pipe with granular or powdered material in fluidized state, comprises a vertically disposed chamber in communication with the inlet end of said pipe at its lower end, said chamber having a connection with a source of gas under pressure at its upper end, a material receiving and storing hopper disposed above said chamber, and valve means between said hopper and the upper end of said chamber, said valve means, when open, allowing gravity flow of said material within said hopper into said chamber and said valve means, when closed, stopping said gravity flow and establishing a fluid-tight closure between said hopper and said chamber.

4. A system as claimed in claim 3, wherein said valve means include a valve body defining a cylindrical through bore vertically disposed having an inlet end communicating directly with said hopper, and an outlet end opening directly into said chamber upper portion, a cylindrical hollow body coaxial with and disposed within said throuh bore of said valve body, a flexible elastic sleeve surrounding said hollow body, means clamping said sleeve in fluid-tight manner onto said hollow body at two longitudinally spaced locations of said sleeve and said hollow body, said hollow body having one end closed in fluid-tight manner, and piping means connected to the other end of said hollow body for admitting compressed gas therein, said hollow body having openings made therethrough intermediate the clamped portions of said sleeve to admit compressed air within said sleeve and cause expansion thereof to seat against the surface of said through bore and thereby close communication between said hopper and said chamber.

5. A system as claimed in claim 4, wherein said valve body closes the upper end of said chamber and has a downwardly extending skirt of restricted external diammeter defining an annular space between the same and said chamber, said pipe connection for admitting gas under pressure into said chamber opening therein opposite said annular space.

6. A system as claimed in claim 5, wherein said piping means in connection with said hollow body include a rigid pipe extending axially of said chamber and connected with the lower end of said hollow body and serving also to support said hollow body within said through bore in spaced relation therewith.

7. A valve for use in conjunction with the flow of granular or powdered material, comprising a valve body having a cylindrical through bore, a hollow cylindrical body extending co-axially of the through bore of said valve body in spaced relation therewith to define an annular space surrounding said hollow body, a flexible elastic sleeve surrounding said cylindrical hollow body, means clamping the marginal end portions of said sleeve in fluid-tight manner on said hollow body, said hollow body having holes made in its cylindrical wall registering with the zone of said sleeve intermediate its clamped portions, said hollow body having a closed end and its other end adapted to be connected to a supply of gas under pressure, whereby admission of gas within said hollow body will cause expansion of said sleeve and seating thereof against the cylindrical surface of said through bore of said valve body.

References Cited by the Examiner

UNITED STATES PATENTS

| | | | |
|---|---|---|---|
| 1,818,367 | 8/1931 | Wallace | 302—59 |
| 2,614,002 | 10/1952 | Snow | 302—17 |
| 2,694,605 | 11/1954 | Berg | 302—53 |
| 2,717,810 | 9/1955 | Hines | 302—53 |
| 2,746,808 | 5/1956 | Stricker | 302—36 |
| 2,774,636 | 12/1956 | Whitlock | 302—17 |

ANDRES H. NIELSEN, *Primary Examiner.*